United States Patent Office 3,389,325
Patented June 18, 1968

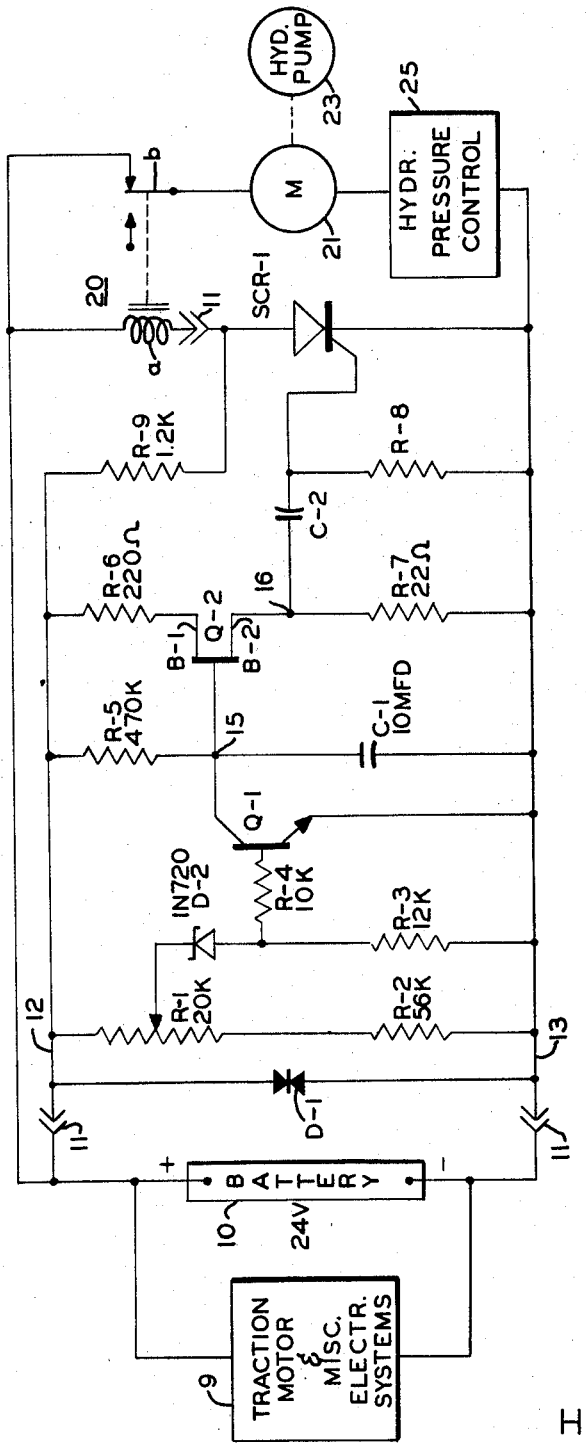

3,389,325
SYSTEM TO DISCONNECT A MOTOR RESPONSIVE TO LOW BATTERY VOLTAGE
Hiram G. Gilbert, Binghamton, N.Y., assignor to The Raymond Corporation, Greene, N.Y., a corporation of New York
Filed Mar. 29, 1966, Ser. No. 538,402
8 Claims. (Cl. 320—31)

ABSTRACT OF THE DISCLOSURE

Apparatus arranged to disconnect one or more of several variable motor loads powered by a storage battery whenever the battery charge becomes low by sensing battery voltage, but arranged not to disconnect the loads during a short-term low voltage caused by heavy loads, including means for sensing battery voltage and charging an integrating circuit when battery voltage is below a predetermined level, deriving a pulse signal to fire a controlled rectifier when the integrating circuit charges to a selected level, with the controlled rectifier connected to operate a relay to permanently disconnect certain loads from the battery but allow other loads to remain connected.

---

This invention relates to a system for protecting operator-controlled battery-powered electrical systems, and more particularly, to an improved system for sensing the charge condition of a rechargeable battery, and for disconnecting the battery, or for otherwise preventing the application of heavy loads to the battery, whenever decrease of the battery voltage to a given level indicates that further discharge of the battery may permanently damage the battery. The invention is particularly useful in connection with battery-powered lift trucks. Systems are known in the prior art in which low battery voltage is caused to illuminate a warning light. Such systems are undesirable in that operators sometimes ignore warning lights. The invention enables the use of a heavy-current relay, so that one or more heavy-current circuits of a truck may be completely locked out. If the lifting capability of a lift truck is disabled when the battery charge condition becomes low, but the tractive circuits of the truck remain connected, the operator can drive the truck back to the battery charging station, but he may not continue to discharge the battery by lifting.

One object of the invention is to provide a battery-charge sensing system which will not itself cause significant battery drain. Another object is to provide a battery-charge-sensing system which is extremely small, so that it may be aded to extremely compact equipment such as "narrow-aisle" lift trucks where available space is a minimum. Though the protective system itself must provide only a small drain from the battery, and though it must be physically small, it necessarily must include one or more high-current capacity relays in order to interrupt or disable one or more high-current circuits.

Because momentary low voltage may appear across a battery due to its internal resistance when the battery is supplying a very heavy load, it is necessary that a useful battery-charge-sensing system ignore momentary low-voltage conditions of less than a predetermined duration, but operate to prevent further battery drain when a low voltage condition persists beyond the predetermined period of time. It is highly desirable that the protective system operate accurately at a selected voltage level, and without any unintentional delay. Furthermore the system must not be sensitive to or damaged by voltage spikes or commutation noise which motors and various other loads may provide. In addition to the numerous above-listed requirements, it is highly desirable that the battery protective system be cheap and reliable, and that it always operate at an accurate voltage level.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which:

FIG. 1 is an electrical schematic diagram illustrating a prepared embodiment of the invention.

In FIG. 1 the protective system is shown connected (via plug contacts 11) to a re-chargeable storage battery 10. Battery 10 is also connected, as symbolized by block 9, to power a plurality of other devices, including, for example, one or more traction motors, and various other lift truck systems. Connected directly across the 24-volt battery voltage between lines 12 and 13 is diode D-1, which is preferably a Thyrector diode which conducts at approximately 40 volts, serving to clip any transient spikes in the voltage across the battery. Such noise spikes, which may occur due to commutation or the like by various other loads (not shown) powered by battery 10, are desirably clipped to prevent them from triggering further circuitry to be described.

A voltage divider comprising adjustable potentiometer R-1 and resistor R-2 is shown connected between lines 12 and 13. When the voltage of battery 10 is at or near its charged value of approximately 24 volts, the voltage on the arm of potentiometer R-1 is sufficient for current to flow through Zener diode D-2 and resistor R-3, biasing transistor Q-1 "on," so that capacitor C-1 is substantially shorted by the Q-1 collector-emitter circuit, and the voltage at terminal 15 is substantially that of negative battery terminal 13. An important feature of the invention is that the circuit elements which are conducting during normal "charge-up" operation draw extremely little current and impose minimum drain on the battery. During such operation, current flows through the resistances R-1 and R-2, through R-1, Zener diode D-2 and resistor R-3, and through the circuits of transistor Q-1.

If the battery voltage decreases sufficiently, whether due to long usage or a momentary heavy load, Zener diode D-2 will cut off, removing the bias from the base of transistor Q-1 and thereby cutting off Q-1. When transistor Q-1 is cut off, the voltage at terminal 15 begins to rise, as capacitor C-1 is charged up through resistor R-5. The rate at which terminal 15 rises when Q-1 is cut off will be seen to be determined by the RC time-constant of resistor R-5 and capacitor C-1, and in practice that time-constant is preferably made long, of the order of several seconds. A time constant of 4.7 seconds is shown in FIG. 1.

The two emitters of unijunction transistor Q-2 are shown connected in series with resistors R-6 and R-7 across the battery. If transistor Q-1 remains cut off sufficiently long for terminal 15 to rise to a predetermined level, unijunction transistor Q-2 will fire and capacitor C-1 will discharge through resistor R-7, providing a positive-going pulse at terminal 16. If battery voltage drops only momentarily due to application of an extra-heavy load, for example, unijunction Q-2 will not fire, because the long time-constant of R-5 and C-1 will prevent terminal 15 from rising far enough to fire unijunction Q-2. The positive-going pulse at terminal 16 is applied through coupling capacitor C-2 to the gate lead of a controlled rectifier SCR-1, preferably a silicon controlled-rectifier, thereby turning on SCR–1. With SCR–1 turned on, current flows from the positive battery terminal through coil a of relay or contactor 20 (and thence through the anode-cathode circuit of SCR–1 back to the negative battery terminal), energizing relay 20. The contact arm b of relay 20 is shown as comprising a normally-closed contact connected in series with a motor M which controls the hydraulic pressure system assumed to power the hydraulic lifting cylinder of a conventional lift truck, so that energization of coil 20 prevents motor M from running, thereby preventing battery 10 from being further discharged. It will be apparent that further contacts may be provided on relay 20 to open or to close other circuits.

Once SCR–1 is turned on by the pulse on its gate lead, it remains on even after gate lead voltage is removed, until such time as its anode-cathode voltage drops to a very low value. Hence relay 20 will remain energized and motor M will remain disabled until battery 10 is removed and replaced by a recharged battery. The circuit shown is preferably mounted in a lift truck so as to be inaccessible to the operator. In the circuit shown resistor R–9 is used in parallel with coil a of relay 20 due to the high inductance of coil 20. Resistor R–9 provides a non-inductive path in which latching or sustaining current may flow as soon as SCR–1 is turned on, as the inductance of coil 20 prevents the immediate flow of sufficient latching current through coil 20.

In typical applications of the invention, a nominal 24-volt battery system would be adjusted to operate when the voltage decreased to 21 volts, or about 12.5% of its full capacity.

Though shown as comprising an adjustable potentiometer, R–1 is preferably adjusted only during assembly of the device, which is preferably "potted."

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Protective apparatus for use with an electric battery connected to supply power to a varying load, comprising, in combination: first circuit means connected across said battery for providing a pulse signal after, and only after, the voltage across said battery has remained below a first predetermined level for a non-zero, predetermined length of time, said first circuit means being operable to provide said pulse signal independently of the amount of current being supplied from said battery during said predetermined length of time; a relay having a contactor and an operating coil, said varying load and said contactor being connected in series across said battery; a controlled rectifier having an anode-cathode circuit and a control element, said anode-cathode circuit being connected in series with said operating coil directly across said battery; and coupling circuit means for applying said pulse signal to said control element of said controlled rectifier.

2. Apparatus according to claim 1 in which said varying load includes a direct current motor and in which said apparatus includes a further motor connected to be powered by said battery independently of said relay and said contactor.

3. Apparatus according to claim 1 in which said first circuit means comprises:
   a series RC circuit including a resistance and a capacitor connected across said battery;
   a transistor having its collector-emitter circuit connected in parallel with said capacitor;
   means responsive to the voltage across said battery for switching off said transistor when said voltage across said battery remains below said first predetermined level; and means responsive to the voltage across said capacitor for providing said pulse signal.

4. Apparatus according to claim 1 in which said load comprises a lifting power unit of a material handling vehicle; and a further load connected across said battery independently of said relay comprises a traction motor of said vehicle.

5. Apparatus according to claim 1 in which said first circuit means comprises: first means connected across said battery for providing a first potential commensurate with the voltage across said battery; second means responsive to said first potential and operative to provide a second potential upon excursion of said first potential below a second predetermined level; integrating means operative to provide an increasing third potential during the occurrence of said second potential; and means responsive to said third potential for providing said pulse signal when said third potential reaches a third predetermined level.

6. Apparatus according to claim 1 in which said first circuit means includes integrating circuit means operative to provide a first potential which increases whenever said voltage across said battery is below said first predetermined level; switching means responsive to said first potential for providing a second potential when said first potential exceeds a second predetermined level; and high-pass filter means connected to receive said second potential and to provide said pulse signal.

7. Apparatus according to claim 1 having resistance means connected in parallel with said operating coil of said relay.

8. Apparatus according to claim 2 in which said voltage-sensitive element includes a unijunction transistor.

References Cited

UNITED STATES PATENTS

| | | | |
|---|---|---|---|
| 3,049,632 | 8/1962 | Staples | 317—33 X |
| 3,170,088 | 2/1965 | Coutsourakis | 317—33 X |
| 3,320,493 | 5/1967 | Culbertson | 317—33 X |
| 3,335,325 | 8/1967 | Elpers | 317—33 X |
| 3,310,729 | 3/1967 | Burgess et al. | 323—22 |
| 3,343,036 | 9/1967 | Steen | 317—31 |

LEE T. HIX, *Primary Examiner.*

S. WEINBERG, *Assistant Examiner.*